United States Patent
Rajewski

(10) Patent No.: US 7,677,450 B1
(45) Date of Patent: Mar. 16, 2010

(54) CONTROL SYSTEM FOR CASHLESS TRANSACTIONS AT METERED VENDING OUTPUT DEVICES

(76) Inventor: Paul Wayne Rajewski, 7 Country Meadow Rd., Rolling Hills Estates, CA (US) 90274

( * ) Notice: Subject to any disclaimer, the term of this patent is extended or adjusted under 35 U.S.C. 154(b) by 1069 days.

(21) Appl. No.: 11/331,483

(22) Filed: Jan. 13, 2006

(51) Int. Cl.
*G06K 15/00* (2006.01)

(52) U.S. Cl. .................................... 235/383; 235/381

(58) Field of Classification Search ................ 235/383, 235/381, 380; 705/16, 5
See application file for complete search history.

(56) References Cited

U.S. PATENT DOCUMENTS

| | | | |
|---|---|---|---|
| 5,619,024 A | 4/1997 | Kolls | |
| 6,505,095 B1 | 1/2003 | Kolls | |
| 6,604,085 B1 * | 8/2003 | Kolls | 705/14 |
| 7,315,824 B2 * | 1/2008 | Chen et al. | 705/1 |
| 7,451,921 B2 * | 11/2008 | Dowling et al. | 235/380 |
| 2001/0037383 A1 | 11/2001 | Sabal | |
| 2003/0004886 A1 * | 1/2003 | Chandar et al. | 705/52 |
| 2003/0088445 A1 * | 5/2003 | Clough et al. | 705/5 |
| 2006/0064580 A1 * | 3/2006 | Euchner et al. | 713/156 |

* cited by examiner

*Primary Examiner*—Ahshik Kim
(74) *Attorney, Agent, or Firm*—Blakely, Sokoloff, Taylor & Zafman, LLP

(57) ABSTRACT

A local area network has a first node to receive an input in the form of account identification data, and a second node to receive this input from the first node via a transport layer protocol. A vending control device connected to the second node includes a relay to be activated and deactivated by the second node. The relay is to enable and disable the functioning of an output device. A circuit is to meter an amount of output processed by the output device. The vending control device is to communicate the amount of output that has been processed to the second node. The second node calculates a cost of the processed output and sends the cost via the transport layer protocol to a remote server. The remote server in turn sends the costs to a gateway through which a payment transaction is settled. Other embodiments are also described and claimed.

20 Claims, 3 Drawing Sheets

| Credit Card No. (Hashed) | Location | User | Transaction Identifier | Amount Of Output Processed | Transaction Cost |
|---|---|---|---|---|---|
| xxxxxxxx | Hotel X | Name, Last Name | 1431314 | 10 Pages Print | $ 1.60 |
| yyyyyy | Hotel X | Name, Last Name | 4173697 | 15 Pages Copied | $ 1.25 |
| zzzzzz | Motel Cheap | | 6413411 | 2 Pages Faxed | $ 1.50 |
| xpxpxpxp | Motel Cheap | | | | |
| ykykykyk | Motel Cheap | | | | |

FIG. 3

CONTROL SYSTEM FOR CASHLESS TRANSACTIONS AT METERED VENDING OUTPUT DEVICES

An embodiment of the invention is directed to the control and management of metered vending output devices with cashless payment transaction capability.

BACKGROUND

A vending control system includes components that perform different tasks in operating equipment that allows a consumer to purchase goods or services via cashless transactions. Such locations are typically unmanned, such as a business center in a hotel guest room. A typical business center offers the use of output device vending that allow Internet access, copying, faxing as well as in some cases printing, from a personal computer or other portable electronic computing and communication device. Modifications have been made to conventional copiers and printers, to enable the vending control system to "meter" the output that has been processed, e.g. count the number of copied or printed pages. The unmanned center in a hotel guest room is typically credit/debit card activated, in that the user first swipes a magnetic stripped credit card through a card reader at the site. The system then dials a telephone number of a credit card clearing house and then requests an authorization (based on the read credit card information and an initial dollar amount). An authorization message and/or code are then received, and the vending control system in response enables the copier or printer. Equipment at the hotel guest room monitors the use of the copier or printer, and counts the number of pages that are dispensed by counting the number of pulses in a signal generated by the copier or printer. At the end of the transaction, the user signals to the equipment that she is finished and in response a total purchase amount is calculated (based on the amount of output that has been metered) and printed on a receipt at the hotel room. At the end of a given time period, a batch of such transactions are collected and sent to a credit card transaction processing firm that initiates the individual transactions with their respective credit card issuers, to settle the transactions on behalf of the merchant (here an owner or administrator of the vending control system).

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

FIG. 3 is a table of customer information stored at a remote server.

DETAILED DESCRIPTION

Figure 1:
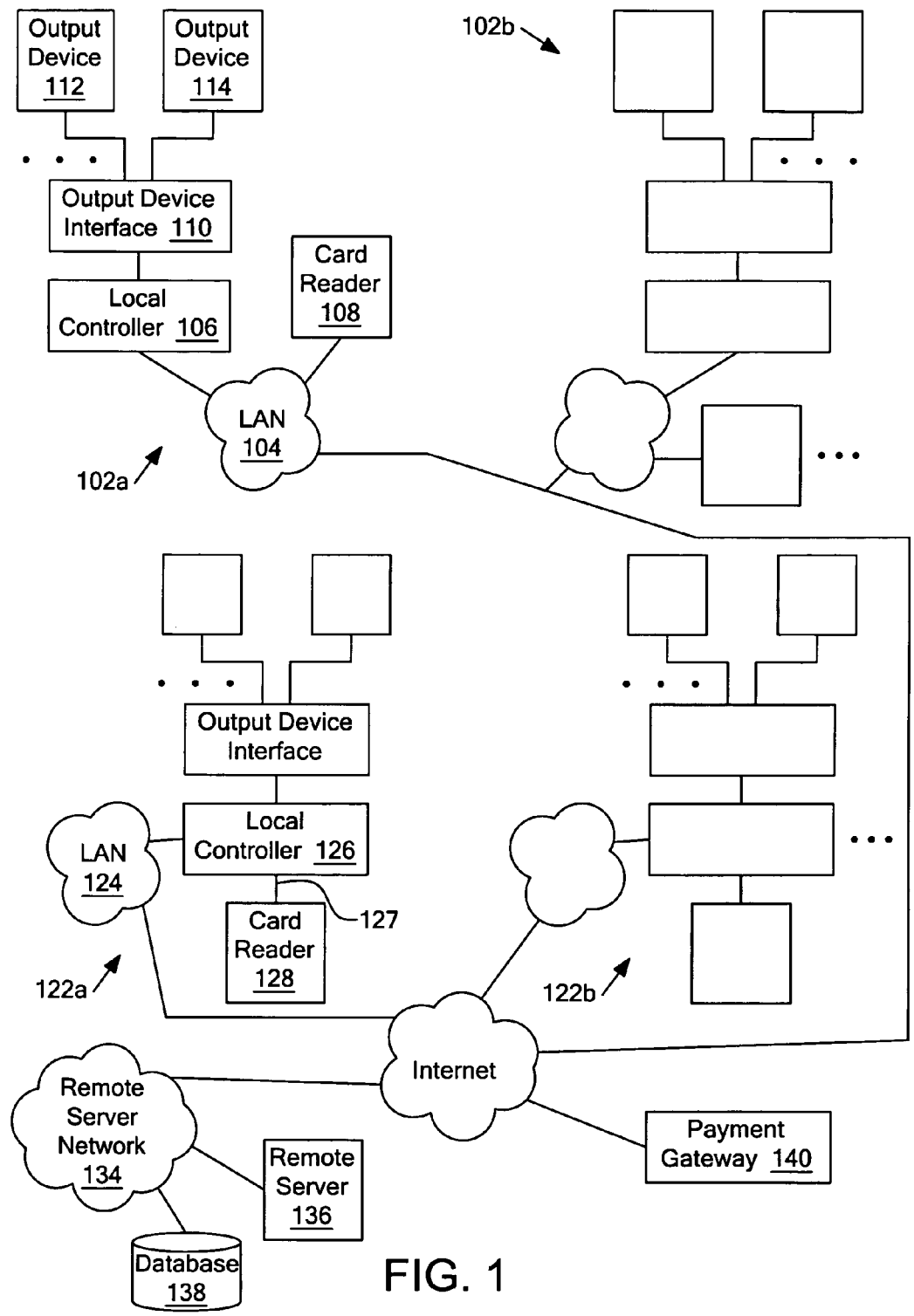
FIG. 1 is an overview of a network environment in which the vending control system in accordance with an embodiment of the invention is implemented.

A vending control system that can monitor and control cashless transactions at vending output devices is described that has a more flexible architecture, lending itself to be more easily scaled as the number of vending output devices to be monitored and controlled increase. Referring to FIG. 1, a network environment for the control system is shown in conceptual form. The control system allows the purchase, at an unmanned location, of goods or services that are to be metered. Metering is required because the cost of each transaction cannot be predetermined but instead needs to be measured in each instance. An immediate example is that of monitoring and controlling the making of photocopies, faxes and prints from a connected, user supplied notebook computer (also referred to as a business center embodiment of the invention). Other applications include the vending of drinking water and the dispensing of gasoline.

The business center embodiment could be deployed at individual hotel guest rooms, with output devices that include a copier, a fax machine, and a computer printer (either separate or integrated into one machine). These are generally referenced in FIG. 1 as output devices 112, 114. There may be several instances of the control system 102a, 102b, . . . that are communicatively coupled to a remote server network 134. Each instance of the control system 102 may be monitored by the server network, to generate reports of transactions, output processed, and failures or problems with the components of the system 102 at each vending location. There may be multiple sets of control systems 102. Each set may be located in a respective hospitality institution (e.g., hotel; motel), with multiple instances of the control system, one in each guest room.

The control systems 102a, 102b, . . . may be deployed in respective hotel guest rooms of one institution, while vending control systems 122a, 122b, . . . could be deployed in the respective hotel guest rooms of another institution. Both institutions would have a service contract with the entity administering the remote server network 134, to provide equipment in the form of a local controller 106, an output device interface 110, a card reader 108 or 128, and one or more output devices 112, 114 in each hotel guest room. The card reader 108, 128 is an example of a device that can obtain input in the form of account identification data from the user. A source of the input may be the user's credit card, debit card, prepaid card, or data that identifies an open account, such as the account associated with a guest hotel room occupied by the user. A printer (not shown) may be connected to the card reader 108 or card reader 128, to receive data from the card reader to print a purchase transaction receipt for the user at the end of the transaction. This could be a separate printer than one implemented in the output devices 112, 114 for copying or printing the user's personal documents. The local controller 106 and the card reader 108 are configured as nodes of a separate LAN in each hotel guest room (where it would be understood that each hotel guest room could also include a separate router to connect the LAN with outside networks).

Each output device 112, 114 in this example dispenses or outputs a different product or service. Accordingly, a different mechanism for monitoring the amount of output that has been processed by each type of output device may be needed. The circuitry needed to make such measurements, and provide the resulting data in a format that can be used by higher layer software, is part of output device interface 110. The output device interface 110 also includes the circuitry needed to enable and disable operation of the output devices 112, 114 by the user. The output device interface 110 receives commands from a local controller 106 to enable or disable a particular output device. In addition, measurements of the amount of output that has been processed are reported by the interface 110 to the local controller 106.

The local controller 106 includes or is part of a node of the local area network (LAN) 104. The controller 106 communicates with other nodes on the LAN, using a network protocol, e.g. Ethernet protocol; and/or a transport control protocol such as TCP/IP. In this example, a card reader 108 is a part of or includes another node of the LAN 104. The card reader 108 is to receive an input in the form account identification data from the user. As an example, the card reader 108 may be a conventional, credit/debit magnetic card reader such as those provided by Hypercom Corp. of Phoenix, Ariz. that are used at point of sale locations. The account identification data includes in that case at least the card number and in some cases an expiration date that have been encoded into a magnetic strip in the card. This information is reported to the local controller 106, again via the network protocol. The local controller 106 in turn connects with a remote server 136, requesting authorization to charge the card with the specified account and purchase information.

The remote server may be part of a remote server network 134 that may be administered by the same entity that supplies and installs the vending control system 102a at the purchase location. The remote server 136, or the remote server network 134, connects in this example over the Internet, with the local controller 106 in each instance of the vending control system 102a, 102b, . . . . The remote server network 134 contains a database that stores information about the usage and operational status of each set of vending control systems 102a, 102b, . . . . Although the database 138 is shown as a node of the remote server network 134, the database 138 may alternatively be a relatively simple data structure that is stored within the remote server 136.

In the case of a new site, the administrating entity could provide not only the local controller 106 and the output device interface 110, but also one or more of the output devices 112, 114. Such an entity could also operate the remote server network 134, to service the local aspects of the vending control system 102a. In particular, the remote server 136 receives the requests from the local controller 106 for authorization, and itself or another server in the remote network 134 (both referred to as "the remote server" 134, 136) makes a separate request to obtain authorization from a payment gateway 140. The connection to the payment gateway 140 may be over a public network, such as the Internet, using protocols such as Internet protocol (IP).

The payment gateway 140 provides payment gateway services that enable merchants to authorize, settle and manage credit card or electronic check transactions at essentially any time of the day and from anywhere that the Internet is accessible. The payment gateway is preferably a secure, Internet bridge between a merchant business and a credit card and electronic check payment processing network. Reliable and secure passage for transaction data is provided, e.g. via a secure socket layer (SSL) IP connection. Payment information is routed to the appropriate credit card processor. In use, the merchant (in this case the entity administering the vending control system 102 and the remote server 134, 136) submits a credit card transaction to the gateway on behalf of a user of the output devices 112, 114. Next, the gateway passes the received transaction information, again preferably via a secure connection, to a merchant bank's processor. The processor transmits the transaction to a credit card interchange which is a network of financial entities that communicate to manage the processing, clearing, and settlement of credit card transactions. The interchange routes the transaction to the users credit card issuer. The credit card issuer approves or declines the transaction based on the customer's available funds, and passes the results, and if approved the appropriate funds, backed through the credit card interchange. These transaction results are relayed back to the payment gateway 140 which stores the results and sends them to the remote server 134, 136. If the transaction results in a complete purchase, the credit card interchange passes the appropriate funds for the transaction to the merchant's bank, which then deposits the funds into the merchant's bank account. Once again, the merchant in this case may be the entity that is administering the vending control system 102.

After receiving an authorization message from the payment gateway 140, the local controller 106 signals the output device interface 110 to enable the functioning of one or more of the output devices 112, 114. The user may be notified that she is free to proceed with using the output devices. Meanwhile, the output device interface 110 will meter the amount of output that has been processed by any output device. In addition, the interface 110 communicates the measured amount of output that has been processed, to the local controller 106. This may be done during the time the output devices are being used, or after the user has indicated that she has finished use of the output devices. At that point, the local controller 106 calculates a cost of the measured, processed output and sends this cost figure (e.g., in U.S. dollars), via the Internet connection, to the remote server 134, 136. The remote server 134, 136 may also receive an indication of how much processed output has been measured by each instance of the vending control system, and can subsequently generate and update a report of the usage in each instance, in real-time, that is at the end of each transaction. Thus, the remote server 134, 136 can produce a report of the current transactions and output device usage at essentially any instant, for review by management of the entity administering the vending control systems.

Once the transaction has been completed by the user, the local controller 106 reports all relevant transaction information to the remote server 134, 136, so that the remote server 136 can then essentially immediately transmit the transaction information to the payment gateway 140 for settlement. There is, therefore, no need to collect a number of transactions and to process them as a batch.

Still referring to FIG. 1, another embodiment of the invention is shown in the form of vending control system 122 (where there can also be multiple instances of such a system, 122a, 122b, . . . ). In that case, the card reader 108 has been replaced with a card reader 128 that connects directly to the local controller 126, instead of being a separate node on the LAN 124. Under that scenario, the LAN 124 may include only two nodes, namely a router (not shown) and the local controller 126. The local controller 126 may be connected to the card reader 128 by a peripheral interface 127 (e.g., a universal serial bus, USB, link).

Figure 2:
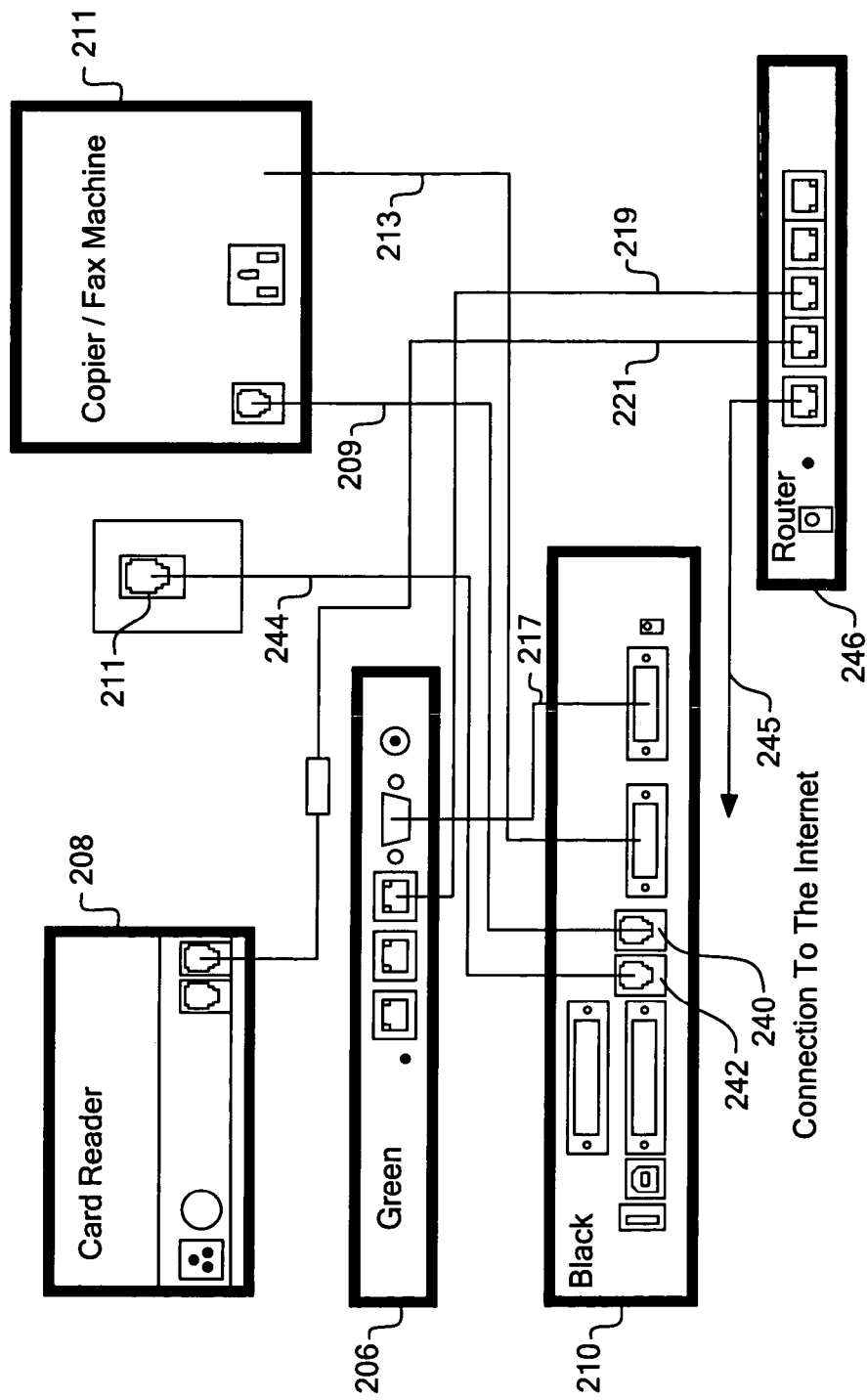
FIG. 2 is a cable connection diagram of the local portion of the vending control system, according to an embodiment of the invention.

Turning now to FIG. 2, a connection diagram of the local portion of the vending control system 102, in accordance with an embodiment of the invention is shown. This is a business center embodiment that includes a copier and fax machine 212 installed in each hotel guest room. The copier and fax machine 212 may be a Canon D880 by Canon Inc. A control cable 213 is pre-installed, that is prior to installing the copier and fax machine 212 in the hotel guest room, that connects with an internal signal line on which the machine 212 generates a predefined logic transition for each page that has been copied or printed. The cable 213 brings voltage pulses, generated by the machine 212 in response to a print or copy request from the user and that represent output pages of the machine 212, to an interface box 210 (also referred to as the "black" box 210). Transitions in the voltage signal are sensed by an isolation circuit (not shown) and then reported to the local controller box 206 (also referred to as the "green" box 206). Data communications between the black box 210 and the green box 206 in this embodiment is via a serial communications link (e.g., RS422 cable 217). Higher layer software manages the communication while running on a processor (not shown) in the black box 210 and communicates with corresponding software running in a processor within the green box 206.

In addition to the voltage transitions that represent the number of pages that are printed or copied, the cable 213 may also include a separate set of wires that have been pre-installed in series with an internal switch of the copier/fax machine 212 that when activated by a user initiates a paper copy. A relay (not shown) within the black box 210 is connected to those wires, so that the copy control circuit is closed or opened on command of the green box 206.

In a further embodiment, the machine 212 also supports outbound fax transmission initiated manually by the user. A conventional telephone cord 209 connects an output of the machine 212 to a wall phone jack 211, while passing through an input jack 240 in the black box 210. A further relay (not shown) in the black box 210 is connected in series with the input jack 240 at the input and an output jack 242 which in turn is connected to the wall phone jack 211 by a further piece of conventional telephone cord 244. That relay closes or opens the path to the wall phone jack 211, to disable or enable the fax transmission on command of the green box 206. For vending fax transmission services, the black box 210 has circuitry that is known in the art for detecting fax protocol tones transmitted on the telephone cord 209 through the input jack 240, to detect the number of pages that have been sent, and/or the period of time spent transmitting a facsimile for the user of the machine 212.

The green box 206 is connected to a router 246, by a LAN cable 219 (e.g., a CAT5 cable). The router 246 in this embodiment has two ports each to connect with a separate one of the green box 206 through LAN cable 219, and the card reader 208 through LAN cable 221. This allows the green box 206 and the card reader 208 to appear as nodes of the LAN, in addition to a third node being the router 246. A connection to an external network, such as the Internet is made by a further port of the router 246, through LAN cable 245. The LAN cable 245 connects its port in the router 246 to preferably a high speed or broadband interface, such as a digital subscriber line (DSL) modem or a channel service unit/data service unit (CSU/DSU) used at one end of a T-1 carrier or T-3 carrier (or also referred to as "DS1" or "DS3" lines). Such high speed communication lines may be leased by the hospitality institution at which the vending control systems 102, 122 have been deployed for making a connection to the Internet. Other ways of connecting the router 246 to the Internet (e.g., using a wireless high speed link) are possible.

In one embodiment, all of the elements shown in FIG. 2 are duplicated and located in each hotel guest room. As an alternative, a single router 246 may be shared by a green box 206 and a card reader 208 of each of two or more adjacent hotel guest rooms. In another alternative, a single green box 206 connects to multiple black boxes 210 of several, adjacent hotel guest rooms. In that case, a single green box 206 could have a single cable connecting it to a router 246, but multiple cable connections with multiple black boxes 210. Other alternatives for arranging the green box 206 and card reader 208 or card reader 128 are possible.

Returning to FIG. 1, the remote server 134, 136 in addition to acting as a relay between a vending control system 102 or 122 and payment gateway 140 (to obtain authorizations or to submit completed transactions), also stores account identification data by its hash value, in association with a date value, a purchase amount based on the calculated costs of a transaction, and an identification of a the geographic location of the vending control system 102 or 122. A database 138 in the remote server network may store a table as in FIG. 3, that allows the entity administering vending control systems to manage its business. Referring to FIG. 3, a table stored in the database may include columns of the following information: hashed, credit card numbers, locations of the vending control systems, user names, transaction identifiers that uniquely identify each cashless transaction (with respect to other transactions handled by the issuer of the associated credit or debit card), amount of output processed in terms of, for example, the number of pages printed, copied, or faxed in the case of a business center embodiment, and the transaction costs in a currency, here, U.S. dollars, to be charged to the credit or debit card.

Note how the credit card number (being an example of, in general, account identification data), is stored by its hash value, to maintain the card number in secrecy. Accordingly, to verify a transaction for which information has been stored in the database, the same hash function is applied to the card number, before it can be compared to a stored value. Note that as a hashed value, the credit card number cannot be decrypted from a practical standpoint. Thus, to confirm that a particular credit card was used for a transaction, only the hashed value of that card number can be compared to one that is stored in the database.

An embodiment of the invention may be a machine readable medium having stored thereon instructions which program a processor to perform some of the operations described above, e.g. establish a connection between a node of a LAN and a remote server, calculate a cost of a vending transaction, and send the cost to the remote server over a TCP/IP connection. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

The invention is not limited to the specific embodiments described above. For example, although the different embodiments of the invention above have been described, particularly with reference to a business center embodiment that has a copier, printer, and a fax machine that are monitored for vending, other embodiments may include additional or alternative output devices. One alternative is a drinking water vending machine, where users bring their own containers that are of no set capacity, and have them filled with water by the vending machine. In that case, output device interface 110 would have the needed circuitry to monitor the volume of water that has been dispensed, and will report the measured amount to the local controller 106 who will then calculate a cost for the sale. The local controller 106 would then communicate with the remote server network 134, 136 over, for example, a transport layer protocol, to request an authorization for the amount to be purchased. The remote server 134, 136 would then in turn obtain the authorization and relay the authorization code back to the local controller 106, over the transport layer protocol. Also, the invention is not limited to use in individual hotel guest rooms. The business center may alternatively be in a common area in each floor of a hotel, or it may be located in a public access copy, fax, and Internet service center such as in a large stationery store, drug store, or library. Accordingly, other embodiments are within the scope of the claims.

What is claimed is:

1. A vending control system comprising:
   a first node of a local area network, wherein the first node is to receive an input in the form of account identification data;
   a second node of the local area network, wherein the second node is to receive the input from the first node via a transport layer protocol;
   a vending control device connected to the second node, the vending control device includes a relay to be activated and deactivated by the second node, the relay is to enable and disable the functioning of an output device, and a circuit that is to meter an amount of output processed by the output device, the vending control device is to communicate the amount of output that has been processed to the second node; and
   wherein the second node is to calculate a cost of the processed output, the second node is to send the cost via a transport layer protocol to a remote server that is to send the cost to a gateway through which a payment transaction is settled.

2. The vending control system of claim 1, wherein a source of the input is selected from the group consisting of a credit card, a debit card, a prepaid card, and data identifying an open account.

3. The vending control system of claim 1, further comprising:
   a router located in the same hotel guest room as the first and second nodes, wherein the first node and the second node are connected to the router.

4. The vending control system of claim 3, wherein the first node and the second node are connected to the router by respective Ethernet cables.

5. The vending control system of claim 1, wherein the transport layer protocol used by the second node to receive the input from the first node is transmission control protocol (TCP).

6. The vending control system of claim 1, wherein the second node is connected to the vending control device by a serial communications cable.

7. The vending control system of claim 1, wherein the relay enables the functioning of the output device by allowing fax tones transmitted by the output device to proceed through to a wall-mounted telephone jack.

8. The vending control system of claim 7, wherein the circuit is to meter the amount of output by detecting fax tones.

9. The vending control system of claim 1, wherein the amount of output that has been processed is the number of pages that has been printed by the output device.

10. The vending control system of claim 1, wherein the amount of output that has been processed is the amount of time expended by the output device in processing.

11. The vending control system of claim 1, wherein the first node further comprises a printer coupled to the second node to receive data from the second node to print a purchase transaction receipt.

12. A vending control system comprising:
   a plurality of sets of local area networks (LANs), each set of LANs located in a respective one of a plurality of distinct hospitality institutions, each LAN having a first node to receive account identification data from a user who wishes to use a respective vending output device that is located in the respective hospitality institution and a second node to receive the account identification data from the first node;
   a remote server to receive the account identification data and a purchase amount from the second node of each of the LANs, and request a purchase authorization from a gateway for said account identification data and said purchase amount, the remote server to send an authorization message to the second node for said account identification data and said purchase amount; and
   a plurality of sets of vending control devices, each set of vending control devices located in a respective one of the plurality of distinct hospitality institutions, each vending control device connected to the second node of a respective LAN, the vending control device includes a relay to be activated and deactivated by the second node, the relay is to enable and disable the functioning of a respective vending output device, and a circuit that is to meter an amount of output processed by the respective vending output device, the vending control device to communicate the amount of output that has been processed to the second node,
   wherein the second node is to calculate a cost of the processed output, the second node is to send the cost to the remote server, and the remote server is to send the cost to a gateway through which a payment transaction for said account identification data is settled.

13. A machine-implemented vending control method comprising:
   receiving at a first node of a local area network (LAN), an input in the form of account identification data from a user;
   establishing a first connection over a transport layer protocol between peer processes in the first node and a second node of the LAN and receiving through the first connection said input at the second node;
   establishing a second connection over a transport layer protocol between peer processes in the second node and a remote server and sending said input from the second node to the remote server through said second connection;
   requesting, by the remote server using the input, a purchase authorization from a payment gateway;
   obtaining a response to the purchase authorization request;
   receiving at the second node, if the response includes an authorization, the authorization from the remote server;
   enabling the functioning of an output device in response to receiving the authorization;
   metering an amount of output processed by the output device in response to a command from the user;
   receiving at the second node, the amount of output that has been processed by the output device;
   calculating a cost of the processed output using the amount;
   sending to the remote server the cost via a transport layer protocol; and
   sending by the remote server the cost to a payment gateway through which a payment transaction of the user may be settled.

14. The vending control method of claim 13, further comprising:
   storing the account identification data at the remote server by its hash value in association with a date value, a purchase amount based on the calculated cost, and an identification of the geographic location of the LAN.

15. The vending control method of claim 13, further comprising:

establishing a plurality of connections over a transport layer protocol between peer processes in the remote server and a plurality of further nodes, respectively, of a plurality of further LANs, respectively; and receiving through the connections account identification data and metered amounts of output processed by output devices for a plurality of users, respectively, who are using the output devices.

16. A vending control system comprising:

a vending control node of a local area network (LAN), to receive and store in volatile memory only, account identification data from a user who wishes to use a vending output device;

a remote server to receive a request for authorization of the account identification data from the control node and in response request and then receive authorization to use the account identification data from a gateway; and a vending control device connected to the control node, the vending control device is to enable and disable the functioning of the output device, and is to meter an amount of output processed by the output device, and communicate the amount of output that has been processed, to the control node, the control node to signal the control device to enable the output device, upon receiving the authorization from the remote server, calculate a cost of the processed output and send the cost to the remote server, and wherein the remote server is to send the cost to a gateway through which a payment transaction is settled.

17. The system of claim 16 wherein the remote server is to store the account identification data in non-volatile storage only as a one-way hashed value associated with said payment transaction.

18. The system of claim 16 wherein the control node comprises:

a computer with a peripheral, serial communications port and an application program that communicates with the remote server via TCP/IP; and a credit card reader that is connected to the computer via the serial communications port.

19. A vending control system comprising:

a vending control node of a local area network (LAN), to receive and store account identification data from a user who wishes to use a vending output device;

a remote server to receive a request for authorization of the account identification data from the control node and in response request and then receive authorization to use the account identification data from a gateway; and a vending control device connected to the control node, the vending control device is to enable and disable the functioning of the output device, and is to meter an amount of output processed by the output device, and communicate the amount of output that has been processed, to the control node, the control node to signal the control device to enable the output device, upon receiving the authorization from the remote server, calculate a cost of the processed output and send the cost to the remote server, and wherein the remote server is to send the cost to a gateway through which a payment transaction is settled, wherein the remote server is to store the account identification data in non-volatile storage only as a one-way hashed value associated with said payment transaction.

20. The system of claim 19 wherein the control node comprises:

a computer with a peripheral, serial communications port and an application program that communicates with the remote server via TCP/IP; and a credit card reader that is connected to the computer via the serial communications port.

* * * * *